(12) United States Patent
Proefke et al.

(10) Patent No.: US 7,167,084 B2
(45) Date of Patent: Jan. 23, 2007

(54) TEMPORARY KEY INVALIDATION FOR ELECTRONIC KEY AND LOCKING SYSTEM

(75) Inventors: David T. Proefke, Madison Heights, MI (US); Thomas E. Utter, Royal Oak, MI (US)

(73) Assignee: General Motors Corporation, Detroit, MI (US)

( * ) Notice: Subject to any disclaimer, the term of this patent is extended or adjusted under 35 U.S.C. 154(b) by 171 days.

(21) Appl. No.: 11/054,570

(22) Filed: Feb. 9, 2005

(65) Prior Publication Data

US 2006/0186988 A1 Aug. 24, 2006

(51) Int. Cl.
*B60R 25/10* (2006.01)

(52) U.S. Cl. ............ 340/426.18; 340/430; 340/426.11; 340/426.35; 307/10.1; 307/10.3

(58) Field of Classification Search ........... 340/426.18, 340/425.5, 426.1, 430, 426.11, 426.35, 457; 307/10.1, 10.3
See application file for complete search history.

(56) References Cited

U.S. PATENT DOCUMENTS 5,337,588 A * 8/1994 Chhatwal ............ 70/278.3
5,831,520 A * 11/1998 Stephan ............ 340/457
2004/0054934 A1 * 3/2004 Emmerling et al. ........ 713/202

* cited by examiner

*Primary Examiner*—Daryl C Pope
(74) *Attorney, Agent, or Firm*—Laura C. Hargitt

(57) ABSTRACT

Methods and apparatus are provided for rendering electronic keys left behind in a vehicle temporarily inactive. The apparatus comprises a vehicle security control module in wireless communication with the electronic keys, and having operatively coupled together a receiver, a processor, non-volatile memory and a short-range transmitter. When the module receives a valid lock command from any source it sends a short-range interrogation signal to keys within the vehicle. Left-behind keys respond and send their unique ID(s) to the module's receiver. The processor obtains the unique ID(s) from the receiver and sets one or more inhibit flags in memory or equivalent to identify those keys as left-behind keys. The processor thereafter ignores commands from such left-behind keys, thereby rendering them temporarily inoperative until a valid unlock command is received form another source, whereupon the processor clears the inhibit flags from memory and restores the left-behind keys to active status.

14 Claims, 2 Drawing Sheets

US 7,167,084 B2

TEMPORARY KEY INVALIDATION FOR ELECTRONIC KEY AND LOCKING SYSTEM

TECHNICAL FIELD

The present invention generally relates to electronic locking systems and keys therefore, and more particularly relates to means and methods for rendering electronic keys for such systems temporarily valid or invalid.

BACKGROUND

There are many applications today where electronic keys are used. A common example is with vehicles where an electronic key, sometimes in the form of a "fob" is enabled by the user to lock and unlock the vehicle doors, trunk, etc., raise and lower windows, start and stop the engine and/or perform a variety of other functions. Such systems are well known in the art.

The present invention is described for the case of electronic keys used to authorize vehicle door access, trunk access, and starting, but this is merely for convenience of explanation and not intended to be limiting. Persons of skill in the art will understand based on the description herein that the present invention applies to any electronic key function and not merely to a "lock" and "unlock" function and not merely to vehicles. Hence, such other electronic key functions are intended to be included in the words "lock" and "unlock" and such other locations, equipment, structures and/or apparatus are intended to be included in the word "vehicle."

While prior art electronic keys and key systems are useful, they suffer from a number of limitations, well known in the art. Among these limitations is the presence of multiple keys. For example, when multiple keys exist and one or more is left behind in the vehicle (or structure), security can be compromised if an unauthorized person gains access to the "left-behind" key. Even if the vehicle is locked if there is an unauthorized entry and the intruder gains access to the left-behind key, he or she may be able to open doors, turn off a security alarm, start the vehicle or otherwise perform those functions able to be controlled by the left-behind key. Thus, a need continues to exist for improved systems and methods for dealing with multiple keys so that left-behind or other temporarily un-needed keys do not represent a security risk.

Accordingly, it is desirable to provide an improved electronic locking and key system and method that mitigate the risk presented by left-behind keys or other keys whose use may be compromised. It is desirable that the system be able to temporarily invalidate electronic keys that are left-behind or that otherwise present a security risk. In addition, it is desirable that the improved system and method be generally compatible with prior art electronic key systems. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for rendering electronic keys left behind in a vehicle temporarily inoperative. The apparatus comprises a vehicle security control module in wireless communication with the electronic keys and having a receiver adapted to receive commands from electronic keys, a processor, non-volatile memory and a short range transmitter, operatively coupled together. When the security module receives a valid LOCK command from any source it sends a short-range interrogation signal to any keys within the vehicle. Such left-behind keys respond and send their unique ID(s) to the module's receiver. The processor obtains the unique ID(s) from the receiver and sets one or more inhibit flags in memory to identify those as left-behind keys. The processor thereafter ignores commands or signals from such left-behind keys, thereby rendering them temporarily inactive. Such left-behind keys remain inactive until a valid UNLOCK command is received form another source, whereupon the processor clears the inhibit flags from memory and restores the left-behind keys to active status.

A method is provided for rendering electronic keys left behind in a vehicle temporarily inoperative. The method comprises receiving a LOCK command, sending a short range interrogation signal from the vehicle security control module to any keys left behind in the vehicle, receiving from any left-behind key(s) their unique ID(s), and setting one or more inhibit flags for the unique ID(s) of the left-behind keys, wherein the inhibit flags cause the vehicle to temporarily ignore further commands or signals received from such left-behind key(s). The left-behind keys remain invalidated until an UNLOCK command is received from other than an invalidated key and the one or more inhibit flags are cleared, thereby returning the left-behind keys to operating status.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
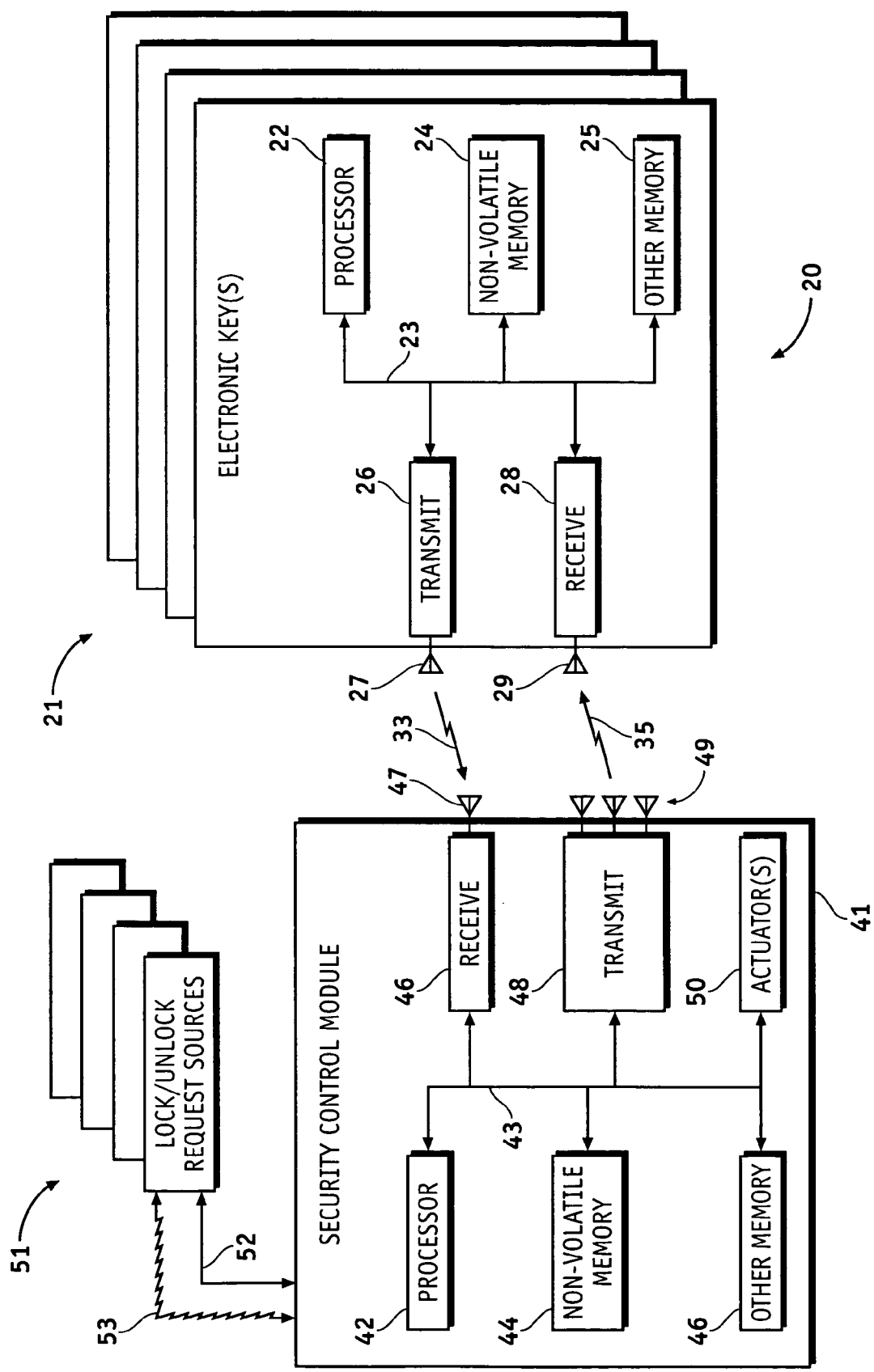
FIG. 1 is a simplified electrical block diagram of the system of the present invention.

FIG. 1 is a simplified electrical block diagram of system 20 of the present invention, comprising security control module 41 in the vehicle (or structure) and one or more portable electronic keys 21 that may or may not be in the vehicle (or structure). Keys 21 comprise processor 22, non-volatile memory 24, other memory 25, transmitter 26 and receiver 28, operatively coupled by bus or leads 23. A state machine or other device may also be used as a replacement for processor 22 and as used herein the word "processor" is intended to include such alternative. Antenna 27 is provided for transmitter 26 and antenna 29 is provided for receiver 28. Keys 21 communicate with vehicle security control module 41 via signals 33, 35 from and to antennas 27, 29 respectively. Transmitter 26 of key 21 and receiver 46 of security control module 41 operate preferably at radio frequencies (RF). Thus, signal 33 is preferably an RF signal. Receiver 28 of key 21 and transmitter 48 of vehicle security module 41 operate preferably at low frequencies (LF). Thus, signal 35 is preferably a LF signal. However, the use of RF and LF signals is not essential. Other frequencies may also be used, provided that signal 35 is limited in range, as will be explained in more detail later. Non-limiting examples of suitable frequencies are 300 to 500 MHz for signal 33 and 100 to 150 KHz for signal 35, but this is not intended to be limiting. Optical signals may also be used. For example, low power infrared may also be used for signal 35.

Vehicle mounted security control module 41 comprises processor 42, non-volatile memory 44, other memory 45, receiver 46, transmitter 48 and actuator(s) 50, operatively coupled by leads or bus 43. Antenna 47 is provided for receiver 46, which receives signals 33 from antenna 27 and transmitter 26 of key 21. Antenna(s) 49 are provided for transmitter 48, which sends signals 35 to antenna 29 of receiver 28 of key 21. Further LOCK/UNLOCK request sources 51 are coupled to control module 41 by leads or bus 52 and/or by wireless signal 53. Non-limiting examples of further LOCK/UNLOCK request sources 51 are central door lock switches, passive door lock switches, telematic services, key activated lock cylinders, alarm system activation/de-activation switches, and so forth.

In one manner of ordinary operation, activation of function buttons (not shown) on electronic key 21 by the user causes processor 22 of key 21 to retrieve the appropriate command code (e.g., LOCK, UNLOCK, etc.) and the key identification code (unique key ID) from non-volatile memory 24. Persons of skill in the art will understand that a variety of operator selected functions may be included in key 21. Processor 22 prepares a signal containing these codes in the appropriate format and passes it over bus or leads 23 to transmitter 26 where it is modulated onto an appropriate (e.g., RF) carrier by transmitter 26 and sent as signal 33 via antenna 27 to antenna 47 and receiver 46 of control module 41. Receiver 46 demodulates signal 33 and passes the recovered command and identification codes over bus or leads 43 to processor 42. Processor 42 compares the received key ID code with valid key ID codes stored in memory 44 and, if approved, causes actuator(s) 50 to execute the command received from key 21. Thus, among other things, processor 42 in cooperation with memory 44, 45 and receiver 46, checks any signals received from key 21 to insure that the ID of the transmitting key corresponds to a key authorized to issue commands to the particular vehicle.

Consider the situation where several valid keys 21 exist, that is, more than one key is authorized to control vehicle functions via security control module 41. The user may take only one key with him/her when he or she exists the vehicle. One or more of the other keys are left behind in the vehicle. The portable key(s) are not the only mechanisms or circumstances able to lock or unlock the vehicle. In general, other lock/unlock request sources 50 are often coupled to the vehicle. For example, and not intended to be limiting, the vehicle may be locked or unlocked by:

a) Activation of a central locking request from the vehicle interior;
b) Transmission of a "lock" command from nearby portable device such as key fob 21;c)
c) Transmission of a "lock" command from a remote service provider (e.g., one of several lock/unlock request sources 50);
d) Activation of a central locking request from a vehicle mounted exterior switch (e.g., another of several lock/unlock request sources 50); and/or
e) Passive locking upon detection of a reduction in electronic keys present in the vehicle's interior.

It is desirable that the left-behind key or keys be rendered temporarily inactive so as to not constitute a potential security risk to the vehicle. This is accomplished by the present invention When any lock activation, such as those listed above, is requested or occurs when the vehicle is in an OFF mode of operation, vehicle mounted security control module 41 determines whether any electronic keys 21 have been left in the vehicle. Alternatively, the vehicle alarm system status (e.g., one of sources 50) may be used as a surrogate for a lock and/or unlock commands, i.e., an ALARM ON command or status is equivalent to a LOCK command. Determining whether any keys remaining the vehicle is conveniently accomplished by processor 42 causing transmitter 48 to send interrogation signal 35 to keys 21 within range, that is, still within the vehicle. Having transmitter 48 be a low frequency (LF) transmitter limits the range of transmitter 48 so that only keys 21 that are still within the vehicle receive interrogation signal 35. When a key receives such an interrogation signal, it responds acknowledging its continuing presence in the vehicle and giving its unique ID. Depending upon the vehicle configuration, it may be advantageous to use several antennas 49 to provide interior vehicle coverage while still having negligible transmission field outside the vehicle. When control module 41 receives a response or acknowledgement signal from key transmitter 26 containing the unique ID of that key, it knows that such key has been left behind in the vehicle. For each key 21 that has been left in the vehicle, processor 42 causes an inhibit flag or other marker to be set in memory 44 to identify the left-behind key as temporarily invalid. Flag storage is performed in non-volatile memory 44 to ensure proper security is maintained over time and voltage levels.

As long as this inhibit flag remains set, the vehicle will not respond to commands from that portable key. For each normal access or vehicle operation request where any electronic key 21 is detected and has passed the normal ID and/or other authentication process, a further check is made of its flag to determine if it is temporarily invalid. If the inhibit flag or other marker is set indicating that the key is invalid, no vehicle action will result. If the inhibit flag or other marker is not set, the corresponding function will be appropriately performed. In the preferred embodiment, upon receipt of an authenticated unlock request from any electronic key 21 that has been deemed to be also a valid key (ID match; no flag set, etc.) or from any other allowed unlock request source, the inhibit flags for all other electronic keys programmed to the vehicle will be cleared, thereby re-validating them all for subsequent use. The operation of system 20 will be more fully understood by reference to the method of the present invention illustrated in FIG. 2.

Figure 2:
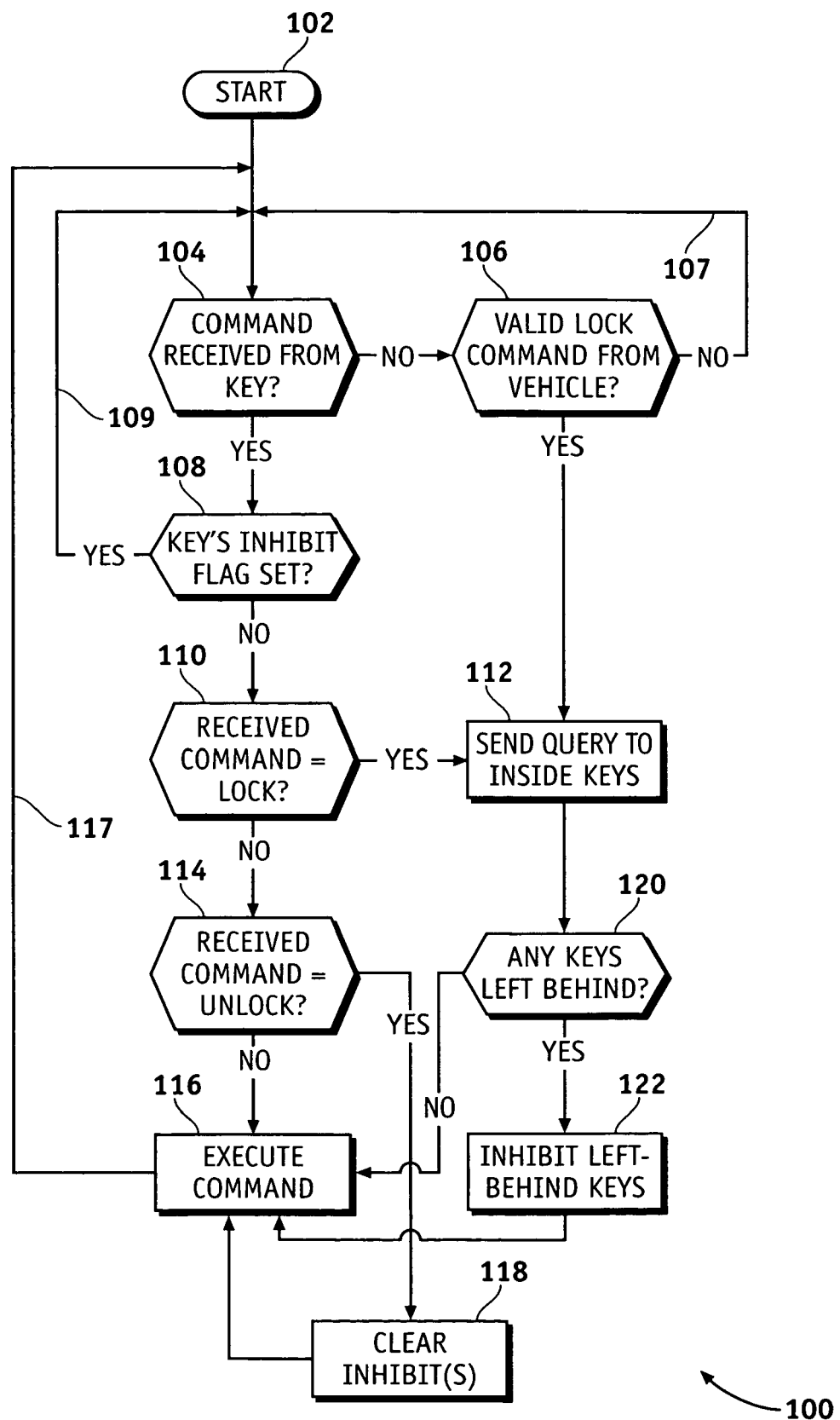
FIG. 2 is a simplified flow chart of the method of the present invention.

FIG. 2 is a simplified flow chart of method 100 of the present invention. Method 100 begins with START 102 and initial COMMAND RECEIVED FROM KEY? query 104. START 102 provides for initialization of system 20 in the key inhibit mode and desirably occurs when the ignition is switched off or the vehicle otherwise placed in the OFF state. In initial query 104 it is determined whether or not the vehicle has received a command from one of keys 21. If the outcome of query 104 is FALSE (NO), abbreviated "N", then method 100 advances to VALID LOCK COMMAND FROM VEHICLE? query 106 wherein it is determined whether or not a valid lock command has been received from the vehicle, e.g., from one of other lock request sources 51. If the outcome of query 106 is FALSE (NO) then, as shown by path 107, method 100 loops back to START 102 and initial step 104. If the outcome of query 104 is TRUE (YES), abbreviated as "Y", then method 100 proceeds to KEY'S INHIBIT FLAG SET? query 108 wherein it is determined whether the key issuing the command referred to in step 104 has its inhibit flag set, to inactivate such key. If the outcome of query 108 is TRUE (YES), then as shown by path 109, method 100 loops back to START 102 and initial query 104. This has the effect of ignoring commands received from a key whose inhibit flag is set while preparing to accept a valid command that originates other than from such portable key 21.

If the outcome of query 108 is FALSE (NO) meaning that the command issuing key is not inhibited, method 100 proceeds to RECEIVED COMMAND=LOCK? query 110 wherein it is determined whether the received command is a LOCK command. If the outcome of query 110 is TRUE (YES), then method 100 advances to SEND QUERY TO INSIDE KEYS step 112, wherein security control module 41 sends localized interrogation or query signal 35 to one or more keys 21 that are within the vehicle. Those of keys 21 that are within the vehicle respond at least with their unique IDs. Module 41 then executes ANY KEYS LEFT BEHIND? query 120 to determine which, if any, of keys 21 have been left behind in the vehicle. Returning to query 106, if the outcome of query 106 is TRUE (YES) indicating that security module 41 has received a valid LOCK command from a key 21 or another lock request source 51, then method 100 also advances to interrogate step 112 and query 120. Thus, if a LOCK command or request is received from either keys 21 or from another source 51, method 100 will determine whether any other of keys 21 have been left behind in the vehicle, and through their unique IDs, which of keys 21 have been left behind in the vehicle. If the outcome of ANY KEYS LEFT BEHIND? query 120 is TRUE (YES), method 100 advances to INHIBIT LEFT-BEHIND KEYS step 122 wherein the keys identified in steps 112, 120 have their inhibit flags set so that they are no longer functional in whole or in part. After step 122, method 100 advances to EXECUTE COMMAND step 116. If the outcome of ANY KEYS LEFT BEHIND? query 120 is FALSE (NO), then method 100 proceeds to EXECUTE COMMAND step 116 wherein the received and authenticated command is executed.

Returning now to query 110, if the outcome of query 110 is FLASE (NO) indicating that the received command was not a LOCK command, then method 100 proceeds to RECEIVED COMMAND=UNLOCK? query 114 wherein it is determined whether the received command is an UNLOCK command. If the outcome of query 114 is FALSE (NO), then method 100 also proceeds to EXECUTE COMMAND step 116. (This deals with the circumstance where the received command is neither a LOCK nor UNLOCK command.) If the outcome of query 114 is TRUE (YES) indicating that the received command is an UNLOCK command, then method 100 proceeds to CLEAR INHIBIT(S) step 118, wherein any inhibit flags previously set are cleared, thereby returning the corresponding key(s) to active status. Following step 118, method 100 proceeds to EXECUTE COMMAND step 116 and thereafter loops back to START 102 as shown by path 117.

In summary, a LOCK command causes control module 41 to interrogate those of keys 21 that may have been left behind in the vehicle and inhibits them from performing all or some of their normal functions until a valid UNLOCK command has been received from another source. The inhibit is conveniently accomplished by placing a flag or other marker in non-volatile memory in control module 41, but any other means of accomplishing an equivalent inhibit result may also be used. A non-limiting example of an alternate arrangement is to send an inhibit command back to the inside-the-vehicle keys using signal 35 and storing the inhibit flag in memory 24 within the inhibited keys themselves. With this arrangement, each key would check its own inhibit flag before sending a command to module 41 and if the flag is set, not transmit to module 41 until its inhibit status is cleared. The same result is accomplished in that inhibited keys are inactivated until module 41 sends out signal 35 containing a CLEAR INHIBITS command to affected keys 21.

While at least one exemplary embodiment has been presented in the foregoing detailed description, it should be appreciated that a vast number of variations exist. For example, inhibiting the left-behind keys by setting a flag in memory is but one of many ways in which the left behind keys may be rendered temporarily inactive. Accordingly, the words "setting a flag in memory" and "storing one or more inhibit flags" or equivalent are intended to include such alternative arrangements for temporarily invalidating the left-behind keys. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system for inhibiting electronic vehicle keys left behind in the vehicle when the vehicle doors are locked, comprising:
    one or more portable keys adapted to send wireless command signals;
    a vehicle security control module adapted to receive the wireless command signals from the one or more portable keys, wherein upon receiving a lock command signal, the vehicle security control module is configured to broadcast a short-range interrogation signal adapted to reach substantially only those of the one or more portable keys remaining within the vehicle, to receive a response containing a unique ID from those of the keys remaining within the vehicle thereby identifying themselves as left-behind keys, to store one or more inhibit flags identifying such left-behind keys as no longer valid and thereafter to ignore commands from such left-behind keys.

2. The system of claim 1 wherein the vehicle security control is further configured to retain the inhibit flags until an unlock command is received from a source other than a left-behind key.

3. The system of claim 1 wherein the security control module comprises:
    a receiver configured to receive command signals from the one or more keys;
    a non-volatile memory configured to store valid key ID(s) and the inhibit flags for left-behind keys;
    a processor coupled to the receiver configured to interpret the command signals reaching the receiver, to test the unique ID received from any key to see whether there is a corresponding inhibit flag therefore stored in the non-volatile memory and if so, not processing a command received from such key; and a transmitter configured to send the short range interrogation signal to the left-behind keys.

4. A method for inhibiting operation of electronic keys left behind in a vehicle, comprising:
receiving a lock command;
sending a short-range interrogation signal adapted to be received by any keys left behind in the vehicle;
receiving from any left-behind key(s) their unique ID(s); and
setting one or more inhibit flags for the unique ID(s) of the left-behind keys, wherein the inhibit flags cause the vehicle to ignore further commands received from such left-behind key(s).

5. The method of claim 4 further comprising:
receiving an unlock command from other than an inhibited key; and
clearing the one or more inhibit flags, thereby returning the left-behind keys to operating status.

6. The method of claim 4 further comprising, prior to the receiving a lock command:
determining first whether a command has been received from a key; and
if the first determining step yields NO, determining second whether a valid lock command has been received from the vehicle; and
if the second determining step yields NO returning to the first determining step; and
if the second determining step yields YES, proceeding to the sending step; and
if the first determining step yields YES, determining third whether the key's inhibit flag is set indicating that the key is invalid.

7. The method of claim 6 further comprising:
if the outcome of the third determining step yields YES, returning to the first determining step; and
if the outcome of the third determining step yields NO, determining fourth whether the received command is a lock command; and
if the outcome of the fourth determining step is YES, proceeding to the sending step; and
if the outcome of the fourth determining step is NO, determining fifth whether the received command is an unlock command; and
if the outcome of the fifth determining step is YES, clearing the one or more inhibit flags, thereby returning the left-behind keys to active status; and
if the outcome of the fifth determining step is NO, executing the received command.

8. The method of claim 5 further comprising after the clearing step, executing a received command.

9. Apparatus for inhibiting left-behind vehicle keys while not inhibiting other keys, comprising:

a security control module in the vehicle for receiving lock/unlock command signals from multiple sources, wherein the security control module comprises operatively coupled elements including:
one or more inputs for receiving lock/unlock commands;
a transmitter for sending interrogation signals to left-behind keys;
a receiver for receiving unique IDs from keys in response to the interrogation signals;
non-volatile memory for storing unique IDs of left-behind keys; and
wherein the apparatus further comprises one or more portable keys for sending command and ID signals to the security control module.

10. The apparatus of claim 9 wherein upon receiving a lock command, the security control module broadcasts through the transmitter the interrogation signal to the left-behind keys.

11. The apparatus of claim 10 wherein the left-behind keys respond to the interrogation signal by sending their unique ID(s) back to the receiver of the security control module, thereby identifying themselves as left-behind keys.

12. The apparatus of claim 11 wherein the security control module stores or marks the unique IDs in the non-volatile memory to identify such left-behind keys as being no longer valid and thereafter, until cleared, ignores commands from such left-behind keys.

13. The system of claim 12 wherein the left-behind keys remain invalid until the vehicle security control module receives an unlock command from a source other than a left-behind key.

14. An apparatus for inhibiting those vehicle electronic keys left behind in the vehicle when its doors are locked, comprising:
a vehicle security control module adapted to receive lock/unlock command signals from multiple sources;
one or more portable keys adapted to send command signals to the security control module and containing memory;
wherein upon receiving a lock command signal, the vehicle security control module broadcasts a short-range signal adapted to reach substantially only those of the keys remaining within the vehicle;
wherein in response to the short range signal, those keys remaining within the vehicle store an inhibit signal in their memory identifying themselves as no longer being valid keys, which thereafter until cleared, causes such keys to not send a valid command to the security control module.

* * * * *